(12) United States Patent
Umeda et al.

(10) Patent No.: US 7,345,725 B2
(45) Date of Patent: Mar. 18, 2008

(54) OPTICAL COMPENSATION FILM, POLARIZING PLATE AND LIQUID CRYSTAL DISPLAY

(75) Inventors: Hiroki Umeda, Hino (JP); Takatoshi Yajima, Hachioji (JP); Noriyasu Kuzuhara, Kunitachi (JP); Koji Tasaka, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 194 days.

(21) Appl. No.: 10/886,434

(22) Filed: Jul. 7, 2004

(65) Prior Publication Data
US 2005/0012883 A1 Jan. 20, 2005

(30) Foreign Application Priority Data
Jul. 15, 2003 (JP) .............................. 2003-197052

(51) Int. Cl.
*G02F 1/1335* (2006.01)
(52) U.S. Cl. ...................................... 349/118; 349/117
(58) Field of Classification Search .................... None
See application file for complete search history.

(56) References Cited

U.S. PATENT DOCUMENTS

| | | | |
|---|---|---|---|
| 6,665,032 B1 * | 12/2003 | Kikkawa | 349/117 |
| 6,937,307 B1 * | 8/2005 | Ito et al. | 349/117 |
| 2002/0005925 A1 * | 1/2002 | Arakawa | 349/117 |
| 2002/0054261 A1 * | 5/2002 | Sekiguchi | 349/122 |

* cited by examiner

*Primary Examiner*—Andrew Schechter
*Assistant Examiner*—W. Patty Chen
(74) *Attorney, Agent, or Firm*—Lucas & Mercanti, LLP

(57) ABSTRACT

An optical compensation film wherein: (i) molecules of a liquid crystalline compound are oriented in a manner that an average tilt angle of the compounds is not more than 4 degrees; (ii) the orientation is fixed; (iii) $Ro(\lambda)$ values are: at wavelength 589 nm: 40-130 nm; at 600 nm: 35-125 nm; and at 630 nm: 35-120 nm; (iv) $Rt(\lambda)$ value are 120-400 400 nm in $\lambda$ range of 500-630 nm; and (v) Values of $Ro(589)$, $Ro(600)$ and $Ro(630)$ satisfy the following formulae:

$$1.0 < B < 7.0$$

$$B = (Ro(589) - Ro(630))/(Ro(600) - Ro(630)).$$

9 Claims, 1 Drawing Sheet

OPTICAL COMPENSATION FILM, POLARIZING PLATE AND LIQUID CRYSTAL DISPLAY

TECHNICAL FIELD

The present invention relates to an optical compensation film, a polarizing plate and a liquid crystal display.

BACKGROUND

According to the current expansion of the personal computers used for multimedia information, liquid crystal displays (LADS) have become larger, and TUFT type liquid crystal displays providing high quality images have become the main current in the field of liquid crystal displays. For these displays, a major improvement in viewing angle characteristics is strongly demanded.

In order to meet this demand, In-Plane Switching (TIPS) mode and Vertically Aligned (VA) mode LADS have been developed in addition to conventional Twisted Nematic (TN) type LADS, and have already been put into practical use.

Furthermore, Optically Compensatory Bend (ORB) mode LADS which enable high speed switching of the image and exhibit superiority in showing motion pictures are also being commercialized. However, these types of displays, except for TIPS type, have problems in viewing angle characteristics and trials to improve the viewing angle characteristics by using an optical compensation sheet (hence, also referred to as an optical compensation film) are being carried out.

Descriptions regarding optical compensation sheets, to be used for the following modes of liquid crystal cells, are found in the following patent documents, for example: for TN (Twisted Nematic) mode LADS, Patent Documents 1-4; for TIPS (In-Plane Switching) mode and FCC (Ferroelectric Liquid crystal) mode LADS, Patent Document 5; for ORB (Optically Compensatory Bend) mode and THAN (Hybrid Aligned Nematic) mode LADS, Patent Documents 6 and 7; for STAN (Super Twisted Nematic) mode LADS, Patent Document 8; and for VA (Vertically Aligned) mode LADS, Patent Document 9.

The above mentioned optical compensation sheet (also referred to as an optical compensation film) is usually adhered to a polarizing plate and used as a monolithic elliptic polarizing plate.

Known as one of the examples of optical compensation sheets usable for this purpose is an optical compensation sheet for a TN mode liquid crystal display, which comprises stacked layers of a coated and immobilized disco tic liquid crystalline compound formed on a cellulose acetate support.

Another example is an optical compensation sheet for a TN mode liquid crystal display, which comprises stacked layers of an optically positive and uniaxial liquid crystalline compound formed on a cellulose acetate support.

Each of these optical compensation sheets has been prepared so as to exhibit desired optical compensation properties under a specified condition by controlling the in-plane retardation value (Ro) and the out-of-plane retardation value in the thickness direction (Rt) of the sheet by suitably selecting a cellulose ester support and liquid crystal layers.

Vertically Aligned mode liquid crystal displays (such as VA, MVA (multidomained VA) and PVA (patterned VA)) are of "normally black mode displays", and enable higher contrast. These displays also enable higher switching speed of images compared to TN or TIPS mode displays. Accordingly, these displays are widely used for monitors and TVs. Since VA mode LADS by nature have narrow viewing angles in oblique directions (or being 45 degrees to the absorbing axis or a transmission axis of a polarizing plate), various types of optical compensation sheets or wide viewing angle films have been proposed to improve viewing angle characteristics, some of which have already been marketed.

For example, trials to prevent leakage of light in any direction using in combination of various $\lambda/2$ and $\lambda/4$ retardation plates have been proposed (for example, Patent Documents 10-14). However, the retardation plate to be used for this purpose requires having very high uniformity in retardation as is easily deduced from the very sensitive alignment angle to the polarizing plate, which results in a considerably low productivity. A very precise technique in adjusting the angle between the optical compensation sheet and the polarizing plate is also required, which also causes lowering of productivity. Accordingly, an easier method to effectively improve the viewing angle characteristics has been searched for.

In order to widen the viewing angle of a Vertically Aligned mode LCD, a method to use a retardation sheet, of which the in-plane delayed phase axis is placed orthogonal to the absorbing axis of a polarizing film, has been proposed.

This method was proposed in the early stages of the development of a Vertically Aligned ECB mode LCD (for example, in Patent Document 15), and a drastic improvement has been attained in viewing angle characteristics in oblique directions. The above improvement has been due to a design specifically focusing on broadening viewing angles.

A method to use a stacked layer type wide viewing angle film using a cholesterick liquid crystal compound has been proposed to widen the viewing angle while suppressing light leakage not only in the frontal direction but also in oblique directions (for example, in Patent Document 16).

As described above, a viewing angle of over 80 degrees at a wavelength of, for example, around 550 nm has been attained by use of various retardation films.

However, as the viewing angle in an oblique direction has exceeded 80 degrees, red hue in black areas in the display has become a pronounced problem, which had been tolerable at lesser viewing angles. The improvement in viewing angle characteristics has lead to the commercialization of large size liquid crystal displays, which resulted in a strong need for solving the red hue problem in the field of LADS. The red hue problem has been difficult to solve merely by optimizing the retardation value of optical film at a wavelength of 550 nm, or by adjusting the wavelength dispersion in the frontal viewing angle.

(Patent Document 1)
   Japanese Patent Publication Open to Public Inspection (hereinafter referred to as JP-A) No. 6-214,116.
(Patent Document 2)
   U.S. Pat. No. 5,583,679
(Patent Document 3)
   U.S. Pat. No. 5,646,703
(Patent Document 4)
   DE No. 3,911,620(A1)
(Patent Document 5)
   JP-A 10-54,982
(Patent Document 6)
   U.S. Pat. No. 5,805,253
(Patent Document 7)
   WO 96/37804
(Patent Document 8)
   JP-A 9-26,572

(Patent Document 9)
  Japanese Pat. No. 2,866,372
(Patent Document 10)
  JP-A 5-11,356
(Patent Document 11)
  JP-A 6-14,842
(Patent Document 12)
  JP-A 2002-174,727
(Patent Document 13)
  JP-A 2002-372,622
(Patent Document 14)
  JP-A 2003-43,262
(Patent Document 15)
  Examined Japanese Patent Publication No. 7-69536
(Patent Document 16)
  JP-A 2002-182,212

OBJECT & SUMMARY

An object of the present invention is to provide an optical compensation film, a polarizing plate using the optical compensation film and a liquid crystal display which enable a viewing angle over 80 degrees while red hue in black areas of the display is suppressed.

An embodiment of the present invention includes an optical compensation film having a specific optically anisotropic layer. The anisotropic layer satisfies a predetermined formula containing in-plane retardation values and out-of-plane retardation values.

DESCRIPTION OF PREFERRED EMBODIMENTS

Figure 1:
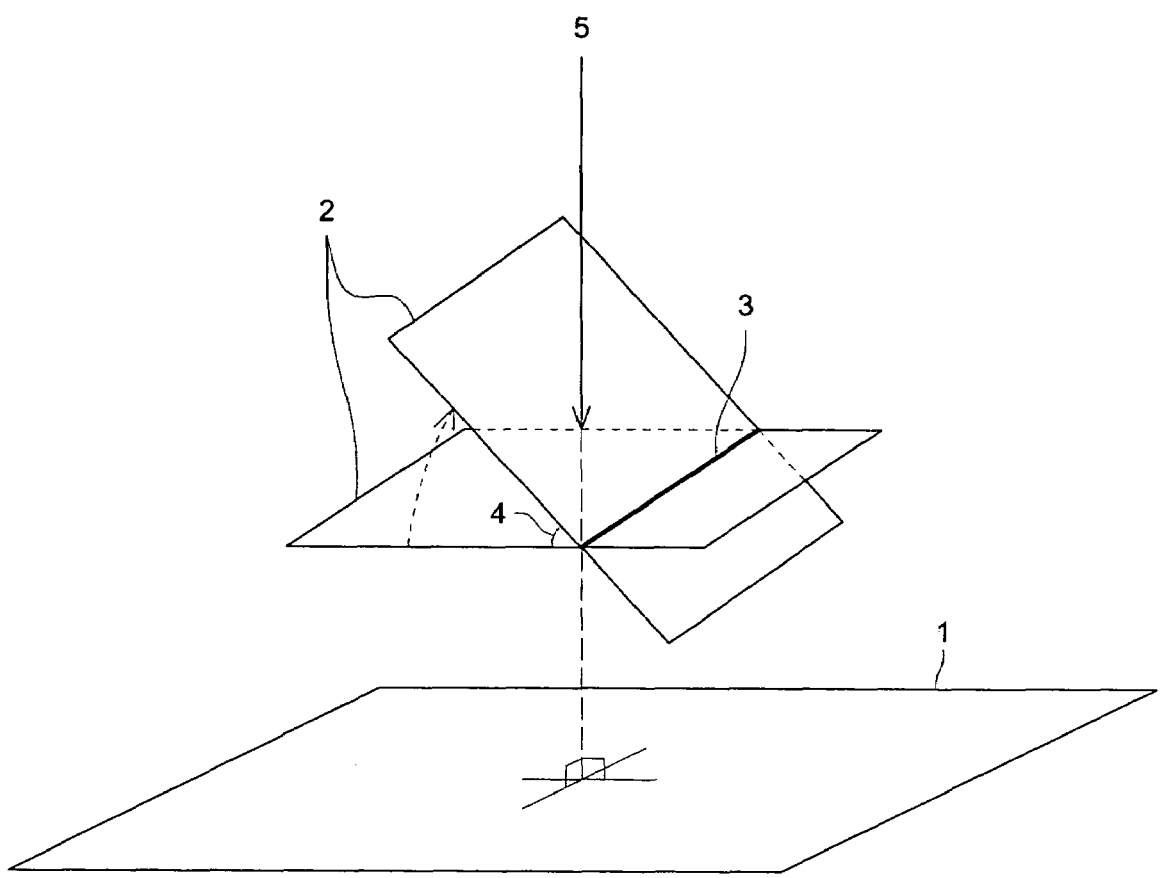
FIG. 1 is a schematic illustration of the measurement of retardation values.

The object of the present invention are achieved by the following structures:

1. An optical compensation film containing a support exhibiting optical biaxiality, on which at least one optically anisotropic layer is provided,
   wherein:
   (i) the optically anisotropic layer is formed by orienting molecules of a liquid crystalline compound in a manner that an average tilt angle of the molecules is not more than 4 degrees followed by fixing the orientation of the liquid crystal molecules;
   (ii) in-plane retardation values of the optical compensation film $Ro(\lambda)$ given by Formula (1) are as follows,
      Ro(589): 40-130 nm
      Ro(600): 35-125 nm
      Ro(630): 35-120 nm
   (iii) an out-of-plane retardation value in a thickness direction of the optical compensation film $Rt(\lambda)$ represented by Formula (2) is in the range of 120-400 nm when measured at wavelengths of 500-630 nm; and
   (iv) Ro(589), Ro(600) and Ro(630) satisfy Formula (3), $Ro(\lambda)=(nx(\lambda)-ny(\lambda))\times d$   Formula (1)

$Rt(\lambda)=((nx(\lambda)+ny(\lambda))/2-nz(\lambda))\times d$   Formula (2)

$1.0<B<7.0$ $B=(Ro(589)-Ro(630))/(Ro(600)-Ro(630))$   Formula (3)

$nx(\lambda)$ representing a refractive index in a x direction which gives a maximum refractive index in the plane of the optical compensation film;
   $ny(\lambda)$ representing a refractive index in a y direction which is orthogonal to the x direction in the plane of the optical compensation film;
   $nz(\lambda)$ representing a refractive index in the thickness direction of the optical compensation film;
   $\lambda$ representing a wavelength (nm) at which each measurement is carried out; and
   d representing a thickness (nm) of the optical compensation film.

2. The optical compensation film of Item 1 wherein a ratio of $R_{70}(589)/Ro(589)$ is 1.25-1.40 and a ratio of $R_{50}(589)/Ro(589)$ is 1.10-1.25:
   $R_{70}(589)$ being a retardation value of the optical compensation film measured by a method of:
      (i) placing the film parallel to a reference plane;
      (ii) rotating the film 70 degrees on an in-plane delayed phase axis of the film; and
      (iii) measuring the retardation value from a direction perpendicular to the reference plane at a wavelength of 589 nm.
   $R_{50}(589)$ being a retardation value of the optical compensation film measured by the same method as $R_{70}(589)$ except for that the film being rotated 50 degrees on the in-plane delayed phase axis of the film;
   and the in-plane delayed phase axis representing an axis of a direction giving a maximum in-plane retardation value.

3. The optical compensation film of Item 1 or Item 2 wherein a wavelength dispersion of the retardation values of the film satisfies Formula(4):

$0<C/D<7.0$ $C=(R_{50}'(589)-R_{50}'(630))$ $D=(R_{70}'(589)-R_{70}'(630))$ $R_{70}'(\lambda)=(nx_{70}'(\lambda)-ny70'(\lambda))\times d$ $R_{50}'(\lambda)=(nx_{50}'(\lambda)-ny_{50}'(\lambda))\times d$   Formula (4)

$R_{70}'(589)$ and $R_{70}'(630)$ each being a retardation value of the optical compensation film measured by a method of:
      (i) placing the film on a plane;
      (ii) rotating the film 70 degrees on an in-plane leading phase axis of the film; and
      (iii) measuring the retardation values from a direction perpendicular to the original plane at wavelengths 589 and 630 nm, respectively.
   $R_{50}'(589)$ and $R_{50}'(630)$ each being a retardation value of the optical compensation film measured by the same method as $R_{70}'(589)$ and $R_{70}'(630)$ except for that the film being rotated 50 degrees on the in-plane leading phase axis of the film;
   the in-plane leading phase axis representing an axis in the plane of the film being orthogonal to the in-plane delayed phase axis.

4. The optical compensation film of any one of Items 1 to 3 wherein retardation values of the optically biaxial support and the optically anisotropic layer measured at a wavelength of 589 nm satisfy Formula (5), $0.44<((R(b)o+R(b)t)/R(e)o)<2.05$   Formula (5)

R(b)o representing an in-plane retardation value of the support defined by Formula (6);

R(b)t representing an out-of plane retardation value of the support in a thickness direction defined by Formula (7); and R(e)o representing an in-plane retardation value of the optically anisotropic layer defined by Formula (8), $$R(b)o=(n(b)x-n(b)y)\times d(b) \quad \text{Formula (6)}$$

$$R(b)t=((n(b)x+n(b)y)/2-n(b)z)\times d(b) \quad \text{Formula (7)}$$

$$R(e)o=(n(e)x-n(e)y)\times d(e) \quad \text{Formula (8)}$$

n(b)x representing a refractive index in a x direction which gives a maximum refractive index in the plane of the support;

n(b)y representing a refractive index in a y direction which is orthogonal to the said x direction in the plane of the support;

n(b)z representing a refractive index in a thickness direction of the support;

d(b) representing a thickness (nm) of the support;

n(e)x representing a refractive index in a x direction which gives a maximum refractive index in the plane of the optically anisotropic layer;

n(e)y representing a refractive index in a y direction which is orthogonal to the x direction in the plane of the optically anisotropic layer; and d(e) representing a thickness (nm) of the optically anisotropic layer.

5. The optical compensation film of any one of Items 1 to 4 wherein the liquid crystalline compound comprises a nematic liquid crystalline compound.

6. A polarizing plate comprising:
   (i) the optical compensation film of any one of Items 1 to 5; and
   (ii) a polarizing film or a polarizing element,
wherein an angle between an in-plane delayed phase axis of the optical compensation film and an absorbing axis of the polarizing film or of the polarizing element is 85-95 degrees.

7. A vertically aligned ECB type liquid crystal display having the polarizing plate of Item 6 on one surface or on both surfaces of a liquid crystal cell of the liquid crystal display.

8. A vertically aligned ECB type liquid crystal display having the polarizing plate of Item 6 on one surface or on both surfaces of a liquid crystal cell of the liquid crystal display wherein $So(\lambda)$ and $C(\lambda)$ satisfy Formulae (9)-(12):

$$0.21\times C(589)\leq So(589)\leq 0.66\times C(589) \quad \text{Formula (9)}$$

$$0.22\leq Ps(\lambda)/Pc(\lambda)\leq 1.75 \quad \text{Formula (10)}$$

$$Ps(\lambda)=(So(\lambda)/So(589)-1)\times 100 \quad \text{Formula (11)}$$

$$Pc(\lambda)=(C(\lambda)/C(589)-1)\times 100 \quad \text{Formula (12)}$$

$So(\lambda)$ representing a sum of in-lane retardation values $(Ro(\lambda))$ of:
   (i) the polarizing films or the polarizing elements of the polarizing plates of claim 6 provided on one surface or both surfaces of the said liquid crystal cell;
   (ii) the optical compensation films in the polarizing plates; and
   (iii) the liquid crystal cell, $C(\lambda)$ representing a product of a birefringence $\Delta n(\lambda)$ and a thickness of the liquid crystal cell, $\Delta n(\lambda)\times d$; and $\lambda$ representing a wavelength in a range of 500-670 nm.

FIG. 1 gives a schematic illustration of the measurements of $R_{50}(589)$, $R_{70}(589)$, $R_{50}'(\lambda)$ and $R_{70}'(\lambda)$ described above.

Each number in FIG. 1 represents below: 1: reference plane; 2: optical compensation film; 3: in-plane delayed phase axis or in-plane leading phase axis; 4: rotating angle (50 or 70 degrees); and 5: measuring direction.

Details of the present invention will be described below:

The process in which the present inventors have developed the optical compensation film of the present invention will be described.

In the field of liquid crystal displays, the shift to large size displays was achieved after the viewing angle problem in oblique directions was solved by the use of retardation film in VA mode LADS. The result of hue tests carried out for VA mode LADS in a normal color display mode (not in a black display mode) was evaluated highly in comparison to other monitors.

However, as a result of: (i) the broadening of a viewing angle in oblique directions over 80 degrees; (ii) the observation from a wide angle (which had been impossible so far); and (iii) the shift to large size displays, red hue in black areas of a display has become a definite problem which had been tolerable in lesser viewing angles. The red hue problem has been difficult to solve merely by optimizing the retardation value of optical film at a wavelength of 550 nm or by adjusting a wavelength dispersion in a frontal direction.

The present inventors have widely examined the red hue problem in a black area of a display in VA mode LCD and have found that the optical compensation film notably reduces the generation of red hue in a black areas of the display even under observation from a viewing angle over 80 degrees in any directions, namely: The optical compensation film wherein: (i) molecules of a liquid crystalline compound are oriented in a manner that an average tilt angle of the molecules is not more than 4 degrees; (ii) the said orientation is fixed; (iii) in-plane retardation values $Ro(\lambda)$ (Formula (1)) are: at wavelength 589 nm: 40-130 nm; at 600 nm: 35-125 nm; and at 630 nm: 35-120 nm; (iv) out-of-plane retardation values in the thickness direction $Rt(\lambda)$ (Formula (2)) are 120-400 nm in $\lambda$ range of 500-630 nm; and (v) Values of Ro(589), Ro(600) and Ro(630) satisfy Formula (3) as follows:

$$1.0<B<7.0$$

$$B=(Ro(589)-Ro(630))/(Ro(600)-Ro(630)).$$

<Optically Biaxial Support>

The optical compensation film of the present invention is characterized by an optically biaxial support having at least one optically anisotropic layer on it.

The optically biaxial support is characterized in that nx, ny and nz, which represent three dimensional components of the refractive index of the optically biaxial support, satisfy Formula (1) (This state is referred to as exhibiting "a biaxial plate characteristic").

$$nx>ny>nz \quad \text{Formula (1)}$$

In addition, the in-plane retardation value and the out-of-plane (thickness direction) retardation value are different.

Herein, the in-plane retardation value (Ro) and the out-of-plane (thickness direction) retardation value (Rt) are defined as follows:

(Thickness Direction Retardation Value (Rt))

$$Rt=((nx+ny)/2-nz)\times d$$

(An In-Plane Retardation Value (Ro))

$$Ro=(nx-ny)\times d$$

In case of nx>ny, the in-plane retardation value obviously never becomes 0.

In the present invention, the expression "optically biaxial" is defined as (i) the three dimensional components of the refractive index satisfy Formula (1) (this state is said to as exhibit "a biaxial plate characteristic") or (ii) the in-plane retardation value is not 0.

Herein, nx represents the refractive index in the x direction which gives the maximum in-plane refractive index, ny represents a refractive index in the y direction which is orthogonal to the x direction, and d represents the thickness of the support (nm). Retardation values Ro and Rt are calculated from nx, ny, nz values which are determined by means of an automatic birefringence meter, for example, KOBRA-21ADH (manufactured by Oji Keisokukiki Co., Ltd.) at 23° C. and 55% RH employing a 590 nm wavelength light.

An optically biaxial support comprises a material exhibiting a biaxial plate characteristic (to be explained later) as a major component, a major component being a component whose content is more than 50 percent by weight. Specific examples of a material used as a major component of an optically biaxial support include, for example: stretched cellulose ester (such as stretched cellulose acetate propionate (CAP) and stretched cellulose triacetate (TAC)) and cycloolefin polymers (to which optically biaxial properties are provided by biaxial stretching).

The optically biaxial properties in the films of cellulose ester derivatives such as cellulose acetate propionate and cellulose triacetate are provided when these films are biaxially stretched.

Examples of cycloolefin polymer include olefin type transparent plastics, for example: ZEONEX (manufactured by ZEON Corp.), ARTON (manufactured by JSR Corp.) and APEL (manufactured by Mitsui Chemicals).

The above mentioned optically biaxial support materials of the present invention may contain other polymers such as those listed below within a compositional range not deteriorating optically biaxial properties. The examples include, foe example: polycarbonate, polysulfone, polyetersulfone, polyacrylate and polymethacrylate.

Various methods are available to provide an optical anisotropy to a cycloolefin polymer based film (support) and above mentioned synthesized polymer films. A film having a desired optical anisotropy is formed by adjusting a stretching direction or a stretching magnification during film forming process.

<Optically Anisotropic Layer>

On the above mentioned optically biaxial support, optically anisotropic layers are formed. In the present invention, at least one of the optically anisotropic layers has following properties (optical property, thickness and orientation of a liquid crystalline compound):

An optically anisotropic layer is formed on a support by the following method: (i) coating a liquid crystalline compound, examples of which will be listed below, (ii) orienting the liquid crystalline molecules in a manner that the average tilt angle of the molecules is not more than 4 degrees by using a rubbing method or an orienting treatment using light both of which are known in the art and (iii) fixing the orientation of the liquid crystalline molecules. Thickness of the anisotropic layer is preferably 0.1-10 μm and more preferably 0.2-5 μm.

<Measurement of Average Tilt Angle>

The average tilt angle is defined as the average angle between directors of liquid crystalline molecules and the plane of the optically anisotropic layer. Measurement of the average tilt angle is carried out by the well known method in the LCD industry, for example, using automatic birefringence analyzer KOBRA21-ADH. (Oji Scientific Instruments). When an optically positive liquid crystalline molecule is used, an average tilt angle is calculated from (i) the angle which gives the maximum retardation value when a film is rotated on a leading phase axis of the film, and (ii) the refractive index of the optically anisotropic layer, based on Snell's Law. When an optically negative liquid crystalline compound is used, an average tilt angle is determined in a same manner as above, except for using an angle which gives a minimum retardation value when the film is rotated on a delayed phase axis of the film.

<Optical Roperties of Optically Biaxial Support and Optically Anisotropic Layer>

In the present invention, the retardation values of the support and of one of the optical compensation layers of the present optical compensation film, at a wavelength of 589 nm, preferably satisfy Formula (5).

$$0.44 < ((R(b)o + R(b)t)/R(e)o) < 2.05 \quad \text{Formula (5)}$$

R(b)o representing an in-plane retardation value of the support described by above mentioned Formula (6);

R(b)t representing an out-of-plane retardation value of the support in a thickness direction described in above mentioned Formula (7); and R(e)o representing an in-plane retardation value of the optically anisotropic layer described in above Formula (8).

The optical compensation film of the present invention may include a plurality of optically anisotropic layers. In such case, d(e) in Formula (8) indicates the total thickness of the plurality of optically anisotropic layers.

<Liquid Crystalline Compound>

Liquid crystalline compounds used in the present invention will be explained.

A liquid crystalline compound used in the present invention may either be a low molecular weight liquid crystalline compound or a high molecular weight liquid crystalline compound. With respect to optical properties, a positive uniaxial rod-shaped liquid crystalline compound or a biaxial liquid crystalline compound is preferably used. A negative uniaxial compound such as a disco tic liquid crystalline compound may also be used. As for optically biaxial liquid crystalline compounds, a rod-shaped compound is preferably used, while a disco tic liquid crystalline compound having a broadened shape may also be used.

Optically negative uniaxial liquid crystal compounds specifically include, for example: disco tic liquid crystalline compounds such as described in "Ekisho no Kagaku": Quarterly Publication, Kagaku Sosetsu, No. 22 (Chemistry of Liquid Crystal Compounds), pp 60-72 (1994) published by the Chemical Society of Japan, more specifically, liquid crystalline compounds having molecular structures 1 through 46 shown on p62 of the same publication, and liquid crystalline compounds disclosed in Japanese Patent No. 2,587,398, 2,640,083, 2,641,086, 2,692,033, 2,692,035, 2,767,382 and 2,747,789.

A rod-shaped liquid crystalline compound exhibiting positive uniaxial properties (also referred to as having positive uniaxiality) and an optically biaxial liquid crystalline compound exhibiting an optical property similar to that of a rod-shaped liquid crystalline compound may be treated as a rod-shaped liquid crystalline compound. Herein, "positive uniaxiality (being optically uniaxial)" indicates the following. In an anisotropic element having optical anisotropy, among the refractive values of nx, ny, nz for three dimensional axes, only two of them are the same, and further, two refractive values are smaller than the other refractive value. "Having biaxiality" indicates that each of the refractive values nx, ny, nz has a different value.

The positive uniaxial rod-shaped liquid crystalline compound of the present invention may be a compound having a positive or negative dielectric constant anisotropy, but is preferably a compound having a positive dielectric constant anisotropy in view of easiness in controlling inclination of optical axes of the crystal liquid-molecules in the thickness direction of the sheet.

Dielectric constant anisotropy (Δε) of the rod-shaped liquid crystalline compound is represented by the difference Δε(Δε=ε//−ε⊥≠0) between dielectric constant (ε//) in a state in which the major axis of the molecule is oriented parallel to the electric field direction, and dielectric constant (ε⊥) in a state in which the minor axis of the molecule is oriented parallel to the electric field direction. Dielectric constant anisotropy (Δε) directly influences anisotropic property of refractive index of light transmitting liquid crystal molecules. The relationship among Δε and anisotropic refractive indices is represented by the following formula:

$$\Delta\epsilon = (n//)^2 - (n\perp)^2$$

wherein n // represents a refractive index to light in the orientation vector direction of liquid crystal molecules, and n ⊥ represents a refractive index to light in the direction perpendicular to the orientation vector of liquid crystal molecules.

Herein, Δε or Δn is a positive value in the liquid crystalline compound used for driving an ordinary TN liquid crystal cell.

In the low molecular weight liquid crystalline compound the whole molecule determines the optically anisotropic property (typically, refractive index anisotropy) of the liquid crystalline compound. A polymer liquid crystalline compound is divided into two kinds, and the one is a main chain type polymer liquid crystalline compound and the other a side chain type polymer liquid crystalline compound. In both types of polymer liquid crystalline compounds, a structure containing a mesogenic group determines the optically anisotropic property in a similar manner as in the low molecular weight compound.

The mesogenic group (or a mesogenic unit) as described above refers to a part necessary for developing a liquid crystal property in a liquid crystalline compound, and the mesogenic group ordinarily comprises a core group being a rigid part, a spacer group being a flexible part, and an end group positioned a the molecular end. However, the mesogenic group does not require all of the above three groups as long as a liquid crystalline compound has a group developing a liquid crystal property.

Examples of the positive uniaxial liquid crystalline compounds will be shown below, but they are not limited thereto.

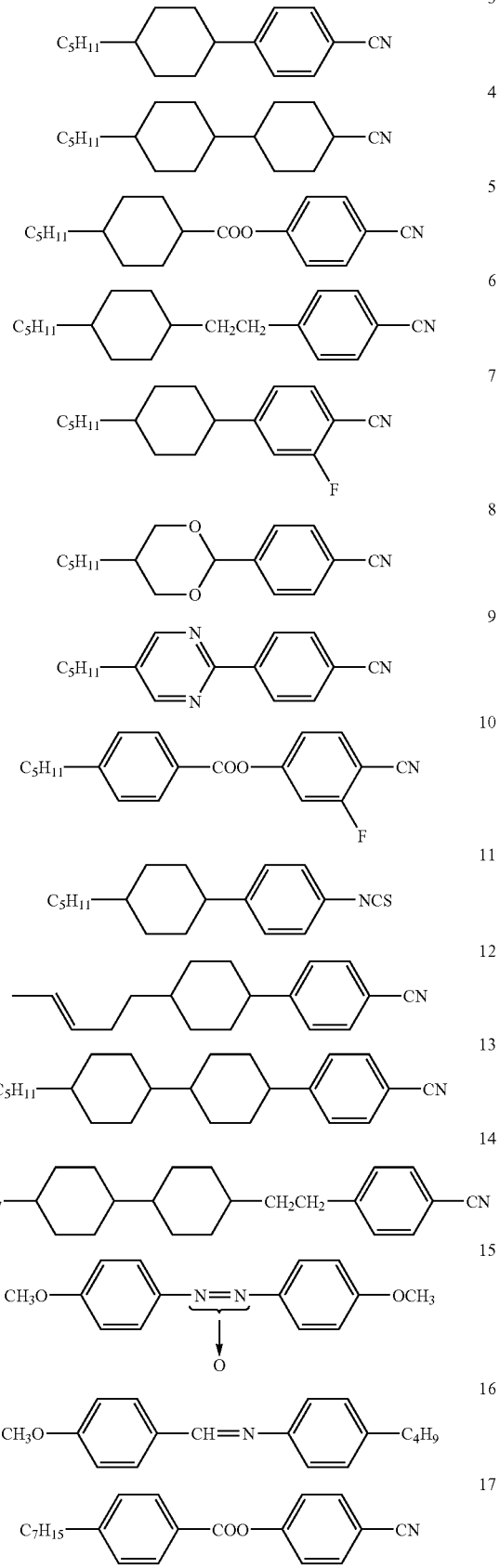

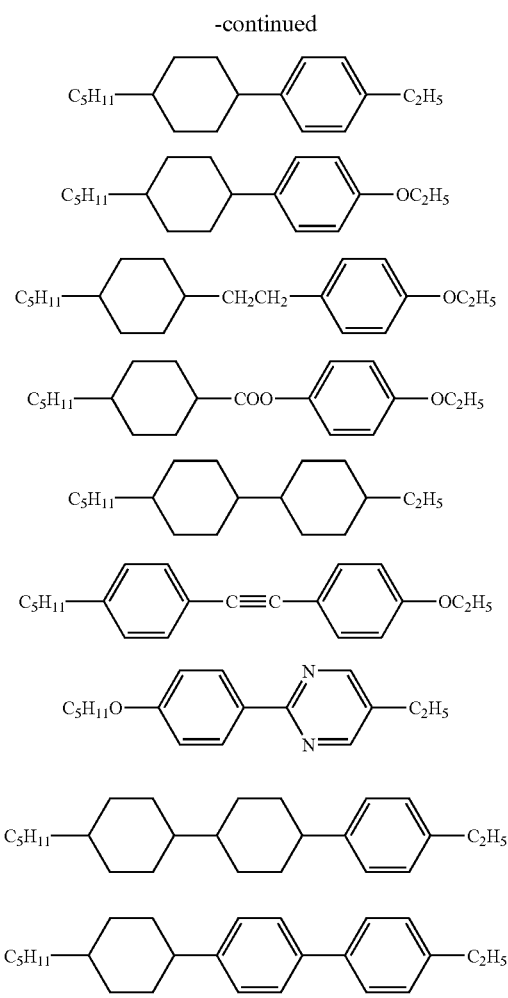

In addition to the above exemplified compounds, compounds described in "Ekisho no Kagaku": Quarterly Publication, Kagaku Sosetsu, No. 22 (1994), pp. 42, 44 edited by Nihon Kagakukai (Gakkai Shuppan Center)" can be used. The above described rod-shaped liquid crystalline compounds having a positive uniaxiality can be suitably used as ordinary rod-shaped nematic liquid crystalline compounds used in TN cells.

Compounds developing a nematic liquid crystal phase are preferably used as the rod-shaped liquid crystalline compounds in the present invention.

The biaxial liquid crystalline compounds include compounds described in Yukigoseikagaku, Vol. 49, No. 5 (1991), pp. 124-143, compounds described in D. W. Bruce et al., AN Eu-Sponsored' Oxford Woershop On Biaxial Nematics' (St. Benet's Hall, University of Oxford 20-22 Dec., 1996), p. 157-293, compounds described in S. Chandrasekhar et al., A Thermotropic Biaxial Nematic Liquid Crystal, Mol. Cryst. Liq. Cryst., 1988, Vol. 165, pp. 123-130, and compounds described in D. Demus, J. Goodby et al., Handbook of Liquid Crystals, Vol. 2B, Low Molecular Weight Liquid Crystals II, pp. 933-943, published by WILEY VCH Co.

The liquid crystal polymers of the present invention are not specifically limited, but are preferably ones having a positive or negative specific double refractive index, which are detailed in "Liquid Crystals, 1989, Vol. 5, No. 1, pp. 159-170".

The polymer liquid crystalline compounds having a mesogenic group used in the present invention are divided into two kinds: one is a polymer having a mesogenic group in the main chain; and the other a polymer having a mesogenic group in the side chain. The polymer liquid crystalline compounds used in the present invention are also divided into different two kinds, namely, thermotropic and liotropic polymer liquid crystalline compounds.

The liquid crystal polymers in the invention are not specifically limited, but are preferably ones forming a nematic liquid crystal. The polymer having a mesogenic group in the side chain is preferable in orientation property, and a thermotropic liquid crystal polymer is preferable in orientation fixation. The main chain used in the above side chain type liquid crystal polymers is preferably that of a vinyl type polymer, polysiloxane, polypeptide, polyphosphazene, polyethylene imine, and cellulose.

In the present invention, molecules of an optically anisotropic compound are preferably oriented in the form of a monodomain or in the form of multi-domains, each domain of which is smaller than 0.1 μm. Herein, "monodomain" means having no disclination, however, in the present invention, disclinations may be basically allowable when the domain size is less than 0.1 μm.

Above mentioned disclination means an existence of minute portions in which optically anisotropic molecules are not oriented. Existence of disclinations may cause various problems such as a decline of contrast of the display or lower tilt angles compared to designed values.

<Birefringent Behavior of Optical Compensation Layer>

Following aspects of the birefringent anisotropic layer of the present invention will be explained, namely: C plate (C plate compensation); A plate (A plate compensation); biaxial plate (biaxial plate compensation); and O plate (O plate compensation).

<C plate>

The C plate of the present invention will be explained.

The relationships among the three-dimensional components nx, ny and nz composing a refractive index of a layer are as follows:

$$nx=ny>nz$$

Herein, the in-plane retardation in the C plane: Ro=0.

Materials (optical materials, resin films) exhibiting the C plate properties include, for example: discotic liquid crystal compounds, non-stretched cellulose ester films (such as non-stretched cellulose triacetate (TAC) and non-stretched cellulose acetate propionate (CAP)) and biaxially stretched norbornene resin films. The C plate is also produced by a controlled biaxial stretching of the above mentioned resins.

<A plate>

The A plate of the present invention will be explained.

The relationships among the three-dimensional components nx, ny and nz composing a refractive index of a layer are as follows:

$$nx>ny=nz$$

Herein, the in-plane retardation in the A plane Ro almost equals to 2×Rt.

Materials (optical materials, resin films) exhibiting the A plate properties include, for example: rod-shaped liquid crystalline compounds and uniaxially stretched polymer (such as polycarbonates).

<Biaxial plate>

The biaxial plate of the present invention will be explained.

The relationships among the three-dimensional components nx, ny and nz composing a refractive index of a layer are as follows:

nx>ny>nz

Herein, the in-plane retardation and the out-of-plane retardation in the thickness direction are different.

Materials (optical materials, resin films) exhibiting the biaxial plate properties include, for example: stretched cellulose ester (such as stretched cellulose acetate propionate (CAP) and stretched cellulose triacetate (TAC)).

<O Plate>

In the O plate of the present invention, utilized is a positive birefringent compound the main optical axis of which is oriented substantially in an oblique direction to the display surface (this is the reason why it is called an O plate).

"Substantially in an oblique direction" means that the angle is more than 0 degree and less than 90 degrees.

The O plate of the present invention may contain a compound which is either uniaxial or biaxial.

<Optical Compensation Film>

The optical compensation films of the present invention will be explained.

<Retardation Roperties of Optical Compensation Films>

The optical compensation film of the present invention contains a support exhibiting optical biaxiality, on which at least one optically anisotropic layer is provided,
wherein:
(i) the optically anisotropic layer is formed by orienting molecules of a liquid crystalline compound in a manner that an average tilt angle of the molecules is not more than 4 degrees followed by fixing the orientation of the liquid crystal molecules;
(ii) in-plane retardation values of the optical compensation film $Ro(\lambda)$ given by above mentioned Formula (1) are as follows,
Ro(589): 40-130 nm
Ro(600): 35-125 nm
Ro(630): 35-120 nm
$\lambda$ representing a wavelength (nm) at which a measurement is carried out;
(iii) an out-of-plane retardation value in a thickness direction of the optical compensation film $Rt(\lambda)$ represented by above mentioned Formula (2) is in the range of 120-400 nm when measured at wavelengths of 500-630 nm; and
(iv) Ro(589), Ro(600) and Ro(630) satisfy above mentioned Formula (3).

The B value of Formula (3) is necessarily more than 1 and less than 7.0 to attain the properties described in the present invention, however, it is preferably 1.3-6.0 and more preferably 1.4-5.0.

<Optical Roperties of Film Rotated on In-Plane Delayed Phase Axis>

Optical properties of an optical compensation film which is rotated on a delayed phase axis of the film:
(1) Rotating 70 degrees:
The ($R_{70}(589)/Ro(589)$) value is preferably 1.25-1.40 and more preferably 1.3-1.4,
wherein, $R_{70}(589)$ representing a retardation value of the optical compensation film measured via a method of:
(i) placing the film parallel to a reference plane;
(ii) rotating the film 70 degrees on an in-plane delayed phase axis of the film; and
(iii) measuring the retardation value from a direction perpendicular to the refernce plane at wave length 589 nm, and
Ro(589) representing an in-plane retardation of the film measured at 589 nm.
(2) Rotating 50 degrees:
The ($R_{50}(589)/Ro(589)$) value is preferably 1.10-1.25 and more preferably 1.11-1.24,
wherein $R_{50}(589)$ representing a retardation value of the film determined by 50 degrees rotating the film on the delayed phase axis of the film and measuring from a direction perpendicular to the reference plane.

$R_{70}(589)$ and $R_{50}(589)$ are determined in the same manner as $Ro(\lambda)$ given by Formula (1) except that the film is rotated, respectively, 70 and 50 degrees on the in-plane delayed phase axis of the film and measured from a direction perpendicular to the reference plane.

<Optical Roperties of Film Rotated On In-Plane Leading Phase Axis>: Wavelength Dispersion The optical properties of the optical compensation film rotated 70 and 50 degrees on the in-plane leading phase axis of the film preferably satisfy Formula (4), namely, the C/D value in Formula (4) is preferably lager than 0 and smaller than 7.0, more preferably 0.4-6.0 and specifically preferably 0.4-5.0.

<Retardation-Enhancing Agent>

Retardation-enhancing agents used in the present invention will be explained.

Retardation-enhancing agents of the present invention are preferably added in a support such as a cellulose triacetate film (also described as a polymer film) in order to optimize retardation values at various wavelengths. The preferable amount of retardation-enhancing agent is 0.05-20 weight parts in 100 weight parts of a polymer film, more preferably 0.1-10 weight parts, further more preferably 0.2-5 weight parts and specifically more preferably 0.5-2 weight parts.

A retardation-enhancing agent may be used alone or in combination with other retardation-enhancing agents. The retardation-enhancing agent may preferably have maximum absorption in a wavelength range of 250-400 nm. Moreover, it may preferably have substantially no absorption in the visible region.

Specific examples of retardation-enhancing agents include compounds disclosed in JP-A 2000-111,914, 2000-275,434 2002-62,477 and European Patent No. 0,911,656A2.

<Orientation Layers (Orientation Films)>

Orientation films use in the present invention will be described:

Orientation films used in the present invention may be prepared by, for example: (i) a rubbing treatment of a film of an organic compound (preferably a polymer film); (ii) oblique evaporation of an inorganic material; (iii) formation of a layer having microgrooves; or (iv) formation of stacked layers of an organic compound (such as, ω-tricosanoic acid, dioctadecyl methylammonium chloride and methyl stearate) using Langmuir-Blodgett technique. Orientation films of which orientation is generated by applying an electric or a magnetic field or by irradiating light, are also known.

An orientation film prepared by rubbing a polymer film is specifically preferable. The rubbing treatment is carried out by rubbing the surface of a polymer film several times in one direction with paper or cloth. Types of polymer used in orientation films are described in the literature on optical compensation films using discotic type liquid crystalline compounds applied for various modes of displays described above.

The thickness of an orientation film used in the present invention is preferably 0.01-5 µm and more preferably 0.05-1 µm. The following preparation method of an orientation film is also available, in which a birefringent layer (optically anisotropic layer) is oriented using a pre-oriented layer (pre-oriented film) followed by transferring the oriented optical anisotropic layer onto a transparent support.

In order to prepare an optically anisotropic layer on an above mentioned orientation film (orientation layer), a monodamain layer may be formed by applying a liquid crystalline compound or a solution containing liquid crystalline compound on the orientation film (orientation layer) followed by drying and heat treating (heat orientation), thus, an oriented layer of liquid crystalline compound is obtained.

Orientation of a liquid crystalline compound in a film or in a layer may be fixed by the following methods: In a case when a UV-curable liquid crystalline compound is used, an coating solution of a liquid crystalline compound including a polymerization initiator is applied and then the liquid crystalline compound is oriented. Under a controlled temperature at which a liquid crystallinity is maintained, the orientation is fixed via irradiation of UV rays. A method of forming chemical bonds such as thermal polymerization may also be used to fix an orientation. When a polymer liquid crystalline compound is used, an orientation may be fixed by heat treating an orientation layer within a temperature range where liquid crystallinity is maintained, followed by quenching the layer below the glass-transition temperature of the polymer.

Liquid crystal molecules the orientation of which is fixed may retain the oriented state even after the pre-oriented film is removed.

<Polarizing Plate>

The polarizing plates used in the present invention will be explained.

A polarizing plate of the present invention is prepared by adhering at least one surface of a commonly used polarizing film with an optical compensation film of the present invention. It may also be prepared merely by forming a polarizing film or a polarizing layer on one surface of an optical compensation film of the present invention.

In order to prepare a polarizing film, an easily stretched-orienting film such as a conventional polyvinyl alcohol film is treated with a dichromatic dye such as iodine, followed by stretching the film in the longitudinal direction. Since a polarizing film itself is not sufficiently self-supporting nor has enough durability, optically isotropic cellulose triacetate films are generally adhered on both sides of the polarizing film as protective films to form a polarizing plate.

The polarizing plate of the present invention may either be prepared by adhering an optical compensation film of the present invention onto the above mentioned polarizing plate or by directly adhering optical compensation film of the present invention as a protective film with a polarizing film. The method of adhering films (also referred to as an adhering method) is not specifically limited, and a glue comprising a solution of water-soluble polymer may be used. An aqueous solution of fully saponified polyvinyl alcohol is preferably used as a water-soluble polymer adhesive. A long size polarizing plate may be prepared by adhering a long size optical compensation film of the present invention with the above briefly described long size polarizing film, which is stretched in a longitudinal direction and treated with a dichromatic dye.

<Polarizing Layer (Polarizing Film)>

The polarizing layer of the present invention will be described.

A polarizing film includes: an iodine type polarizing film, a dye type polarizing film using a dichromatic dye and a polyene type polarizing film. An iodine type polarizing film and a dye type polarizing film are generally prepared from a polyvinyl alcohol type film. The polarizing axis of a polarizing plate is preferably orthogonal to the stretching direction of the film.

<Vertically Aligned ECB Mode Liquid Crystal Display>

The vertically aligned ECB mode liquid crystal display of the present invention will be described.

In order to reduce red hue in black areas of a wide viewing angle display, the polarizing plate of the present invention is preferably used in a display in which vertically aligned liquid crystals are employed, examples of which include: a VA (Vertically Aligned) mode display and a MVA (Multi-domain Vertically Aligned) mode display.

One of the examples of a construction of a single polarizing plate-reflective type liquid crystal display may be shown as: [protective film/polarizing film/optical compensation film (present invention)/glass substrate/ITO transparent electrode/orientation film/VA mode liquid crystal/orientation film/metal electrode also working as a reflector of light/glass substrate]

Optical compensation films (also referred to as optical compensation sheets) prepared so far have not sufficiently reduced red hue which notably appears in large size liquid crystal displays, however, by using the optical compensation sheet of the present invention, red hue in black areas in the display is drastically reduced even in a wide viewing angle.

A reflection type polarizing element comprising an optical compensation film of the present invention, and a cholesteric mode liquid crystal may be structured as follows: [back light/cholesteric liquid crystal layer/optical compensation film of the present invention/polarizing film/protective film].

In order to reduce-red hue in black areas of a wide viewing angle display, a liquid crystal display to be used with the optical compensation film of the present invention is required to be of a vertically aligned ECB mode. Examples of a liquid crystal cell to be used in a vertically aligned ECB mode liquid crystal display include, for example: a VA (Vertically Aligned) mode cell and a MVA (Multi domained VA) mode cell.

In the vertically aligned ECB mode liquid crystal display of the present invention, Formula (9) is preferably satisfied and the $Ps(\lambda)/Pc(\lambda)$ value of Formulae (10), (11) and (12) is preferably 0.22-1.75 and more preferably 0.23-1.50.

EXAMPLES

The present invention will be explained according to examples as follows, however, embodiments of the present invention are not limited thereto.

Example 1

Optically biaxial Supports A-G, optical compensation films of the present invention A-G, and optical compensation films for comparison H and I were prepared as follows:

<Preparation of Optically Biaxial Support A>

Support A having optical biaxiality and exhibiting the retardation values (Ro, Rt) shown in Table 1 was prepared as follows: On a 80 µm thick triacetyl cellulose film (manufactured by Konica Corp.), (i) a 0.1 µm thick gelatin film was formed, (ii) Solution 1, composition of which was shown below, was coated at a thickness of 0.2 μm, (iii) the film was dried, and (iv) the resulting film was subjected to a rubbing treatment.

(Composition of Solution 1)

| Compound 1 | 1 percent by weight |
| Ion exchanged water | 98 percent by weight |
| Methanol | 1 percent by weight |

Compound 1

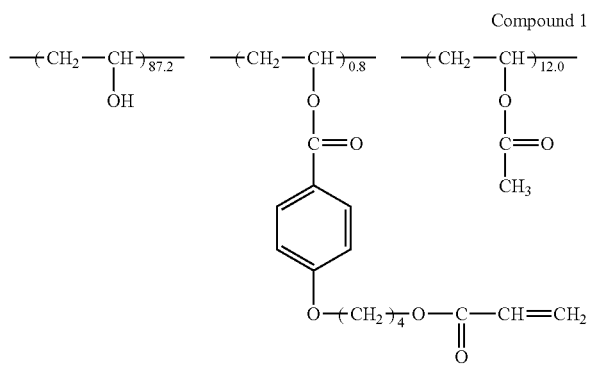

<Preparation of Optically Biaxial Support B>

Optically biaxial Support B having a thickness of 80 μm and exhibiting the retardation values (Ro, Rt) shown in Table 1 was produced using the same preparation method as Support A except that a CAP (cellulose acetate propionate) solution was used instead of a triacetyl cellulose solution.

The specific procedure of coating the CAP solution is as follows: (i) a coating solution is uniformly flow-casted on an endless 6 m long stainless-steel belt (effective length is 5.5 m); (ii) the film is dried for 2 minuets by applying water of 35° C. to the rear side of the stainless-steel belt; (iii) water of 15° C. is applied onto the rear side of the belt; (iv) the film is dried until the residual solvent content is reduced to 20%; (v),the film is peeled from the support at a tension of 150 N/m; and (vi) the film is, further dried.

(Preparation of Cellulose Acetate Ropionate Solution)

Following compositions were charged into a sealed and pressurised vessel, and stirred at 80° C. to form a homogeneous solution of cellulose acetate propionate.

Cellulose Acetate Ropionate (CAP) 120 Weight Parts
(Substitution Degrees of CAP were as Follows:
Acetyl substitution degree: 1.9;
propionyl substitution degree: 0.75; and
total substitution degree: 2.66)

| 2-(2'-hydroxy-3',5'-di-t-butylphenyl) benzotriazole (UV absorbing agent) | 1 weight part |
| Ethylphthalylethyl glycolate (plasticizer) | 4 weight parts |
| Silica microparticles (Aerosil200 from Nippon Aerosil Co., Ltd., mean particle diameter: 0.016 μm) | 0.1 weight parts |
| Methyl acetate | 300 weight parts |
| Ethanol | 45 weight parts |

<Preparation of Optically Biaxial Supports C and D>

Optically biaxial Supports C and D were prepared in the same manner as Support B except that, after the flow-casted CAP film was dried and peeled from the support when the content of residual solvent became lower than 45 percent, the web (film) was stretched in the machine direction (MD) to form Support C and in the transverse direction (TD) to form Support D by clipping both sides of the web using tenter hooks. Each of the stretching magnifications in both MD and TD directions was in the range of 1.1-1.5. The difference in the optical property of Supports C and D is shown in Table 1.

<Preparation of Optically Biaxial Support E>

Support E exhibiting the retardation values (Ro, Rt) shown in Table 1 was prepared in the manner described below. In the present invention, support E is also referred to as cycloolefin polymer film E.

Process 1: As a polymerization catalyst, 10 weight parts of 15 percent solution of triethylaluminum in cyclohexane, 5 weight parts of triethylamine and 10 weight parts of titanium tetrachloride were added to 6-methyl1,4,5,8-dimethanol-1,4,4a,5,6,7,8,8a-octahydronaphthalene for a ring-opening polymerization in cyclohexane. A polymer was obtained by hydrogenating the product. The polymer was coagulated in isopropyl alcohol and dried to form resin powder. The resin showed the following characteristics: the number average mean molecular weight was 40,000; the degree of hydrogenation was not less than 99.8 percent; and Tg was 142° C.

Process 2: The resin powder obtained in process 1 was pelletized by melting at 250° C. A sheet was prepared by melt-extruding the pellets through a T-die of 300 mm width using a uniaxial extruder having a 40 mm fullflight screw. The obtained film was cooled and wound using three rollers, each of which had a diameter of 300 mm. The temperature of the film at the die was 270° C., and the temperatures of the 1st, 2nd and the 3rd rollers were, respectively, 120, 120 and 100° C.

Process 3: The sheet was stretched at a controlled temperature of 140±2° C. to form a 51 μm film.

Rocess 4: 2 g of PMMA (polymethyl methacrylate) was dissolved in a mixed solvent of 45 g of MEK (methyl ethyl ketone) and 5 g of cyclopentanon and coated on the stretched and oriented film. The film was then treated with a rubbing instrument to form optically biaxial Support E. The direction of rubbing was parallel to the delayed phase axis of the film.

<Preparation of Optically Biaxial Support F>

Support F exhibiting the retardation values (Ro, Rt) shown in Table 1 was prepared in the manner described below. In the present invention, Support F is also referred to as cycloolefin polymer film F.

A 100 μm polynorbornene film (trade name "ARTON FILM" manufacture by JSR Corp.) was biaxially stretched at 180° C. to a longitudinal stretching magnification of 1.10 and a lateral stretching magnification of 1.15 using a simultaneous biaxial stretcher. The thickness of the central part of the film was 81 μm, the width of the film was 345 mm.

2 g of PMMA (polymethyl methacrylate) was dissolved in a mixed solvent of 45 g of MEK (methyl ethyl ketone) and 5 g of cyclopentanon, and thencoated onto the above mentioned oriented film by stretching. The film was then treated in a rubbing instrument to form a optically biaxial Support F. The rubbing direction was parallel to the delayed phase axis of the film.

<Preparation of Optically Biaxial Support G>

Support G exhibiting retardation values (Ro, Rt) shown in Table 1 was prepared in the manner described below. In the present invention, Support G is also referred to as cycloolefin polymer film G.

A 100 μm thick polynorbornene type film (trade name "ARTON FILM" manufactured by JSR Corp.) was biaxially stretched at 180° C. to a longitudinal stretching magnification of 1.10 and a lateral stretching magnification of 1.15 using a simultaneous biaxial stretcher. The film was then left at 180° C. for 60 seconds to reduce the film width down to 98%. The thickness of a central part of the film was 81 μm, and the width of the film was 345 mm.

2 g of PMMA (polymethyl methacrylate) was dissolved in a mixed solvent of 45 g of MEK (methyl ethyl ketone) and 5 g of cyclopentanon, and subsequently coated on the stretched and oriented film. The film was then treated with a rubbing instrument to form an optically biaxial Support F. The rubbing direction was parallel to the delayed phase axis of the film.

<Preparation of Support H for Comparison>: A Support Which Does Not Show Optical Biaxiality.

Support H for comparison was prepared as follows: 100 g of polycarbonate was dissolved in 500 g of methylene chloride and flow-casted on a stainless-steel belt. After the resulting film was peeled, the film was biaxially stretched.

<Preparation of Support I for Comparison>: A Support Which Does Not Show Optical Biaxiality.

A 100 μm thick TAC film was used as Support I for comparison.

Retardation values (Ro, Rt) of optically biaxial Supports A-G and Supports H and I for comparison are given in Table 1.

TABLE 1

| Support No. | Ro(589 nm) | Rt(589 nm) | Optical biaxiality |
|---|---|---|---|
| A | 1.7 | 54 | Yes |
| B | 2.2 | 108 | Yes |

TABLE 1-continued

| Support No. | Ro(589 nm) | Rt(589 nm) | Optical biaxiality |
|---|---|---|---|
| C | 15 | 116 | Yes |
| D | 30 | 206 | Yes |
| E | 1.1 | 30 | Yes |
| F | 2.2 | 45 | Yes |
| G | 15 | 230 | Yes |
| H | 125 | 62.5 | No |
| I | 0 | 71 | No |

Table 1 reveals that Supports A-G, the in-plane retardation values Ro of which are not 0, are optically biaxial supports of the present invention and Supports H and I do not show optical biaxiality.

<Preparation of Optical Compensation Films A-G> of the Present Invention:

Optical compensation films A-G of the present invention having optically anisotropic layers were prepared as follows: A solution having the following composition was coated on the optically biaxial Supports A-G obtained as above and dried at 100° C. for 15 seconds. The resulting films were gradually cooled and UV-cured at 45° C.

(Composition of Coating Solution of Optically Anisotropic Layer)

| | |
|---|---|
| MEK | 86 weight parts |
| Compound 2 | 3 weight parts |
| Compound 3 | 2 weight parts |
| Compound 4 | 3 weight parts |
| Compound 5 | 3 weight part |
| Irgacure 369 (CIBA SPECIALTY CHEMICALS) | 1 weight part |

Compound 2

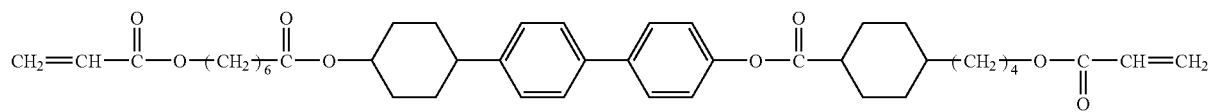

Compound 3

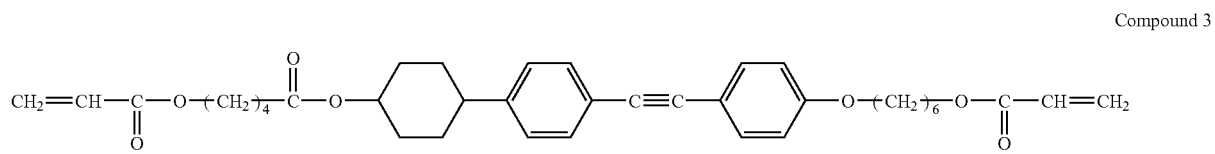

Compound 4

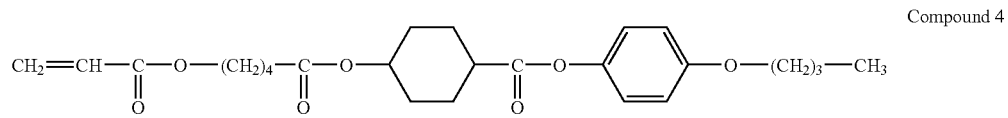

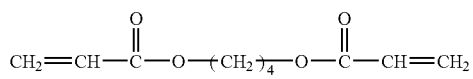

Compound 5

Each hardened layer containing one of the liquid crystalline compounds 2-5 was an optically anisotropic layer of a thickness of 1.4 μm. The average tilt angle of each anisotropic layer was measured by KOBRA-21ADH (manufactured by Oji Keisokukiki Co., Ltd.) and was found to be no greater than 4 degrees.

<Preparation of Optical Compensation Film H for Comparison>

Support H was coated with Solution 1 which had been used for the preparation of optically biaxial Support A. The resulting film was dried, subjected to a rubbing treatment and was coated with the above described coating solution of an optically anisotropic layer. After that, optical compensation film H, for comparison, was prepared through the same treatment as that of optical compensation films A-G.

<Preparation of Optical Compensation Film I for Comparison>

Optical compensation film I was prepared as follows: (i) A gelatin layer was formed on Support I prepared for comparison; (ii) a PVA solution was coated, and then dried; (iii) a coating solution was applied; (iv) heat treated for drying ; and (v) after confirming that a monodomain was formed, the film was hardened by UV irradiation. Formation of monodomain was confirmed by observing a small portion of the sample with a polarizing microscope.

Optical properties of optical compensation films A-G obtained as above and those of optical compensation films H and I for comparison are given in Table 2.

TABLE 2

| Optical compensation film No. | $R_o(\lambda nm)$ | | | $R_t(\lambda nm)$ | B* | Remarks |
|---|---|---|---|---|---|---|
| | 589 | 600 | 630 | 589 | | |
| A | 40 | 39.6 | 38.4 | 150 | 1.33 | Inv. |
| B | 83 | 81.3 | 78.3 | 266 | 1.57 | Inv. |
| C | 107.9 | 106 | 102.2 | 308 | 1.50 | Inv. |
| D | 98.2 | 97.4 | 96.3 | 288 | 1.73 | Inv. |
| E | 125 | 123 | 120 | 134 | 1.67 | Inv. |
| F | 125 | 123 | 117 | 169 | 1.33 | Inv. |
| G | 110 | 107.8 | 107.1 | 281 | 4.14 | Inv. |
| H | 125.0 | 122.0 | 121.0 | 120.5 | 7.00 | Comp. |
| I | 0 | 0 | 1.1 | 1.2 | 0.00 | Comp. |

B* = $R_o(589)-R_o(630))/R_o(600)-R_o(630))$
Inv.: Present Invention
Comp.: Comparison The optical properties of the optically biaxial supports, optically anisotropic layers and optical compensation films (refractive indices, in-plane retardation values, and out-of-plane retardation values in the thickness direction) were calculated from the three dimensional refractive indices nx, ny, nz which were determined via three dimensional measurement of refractive indices using an automatic birefringence analyzer KOBRA21-ADH. (Oji Scientific Instruments) at wavelengths of 589, 600, and 630 nm at 23° C. under 55% RH (relative humidity).

<Preparation of Polarizing Plates A-G of the Present Invention and Polarizing Plates H and I for Comparison>

Polarizing plates A-G of the present invention, and polarizing plates H and I for comparison were prepared as follows: Each of the polarizing plates was prepared by adhering (directly glued or using adhesive sheets) optical compensation films of one of A-I on both sides of a polarizing film, of which the preparation method is described below.

A commercially available PVA type glue was used for adhering a polarizing film with optical compensation films to form polarizing plates A-D, while 25 μm adhesive sheets was used to prepare polarizing plates E-G of the present invention and H and I for comparison.

(Preparation of Polarizing Film)

A polarizing plate was prepared as follows: (i) a non-stretched PVA film of a thickness of 80 μm, a width of 800 mm, and a polymerization degree of 2400 was stained with iodine in an aqueous solution of 0.3 percent by weight of iodine; (ii) the film was stretched to a factor of 6.8 in an aqueous solution of 4 percent by weight of boric acid and 3 percent by weight of potassium iodide; (iii) the film was dried at 40° C. for 4 minutes; and (iv) the film was wound onto a roll.

<Preparation of Liquid Crystal Displays LCDa-LCDi>

LCDa-LCDi were prepared by: (i) removing polarizing plates of commercially available MVA mode LADS (LCDAD19H manufactured by I•O DATA Corp.); (ii) on each LCD, a pair of the polarizing plates of any one of A-G of the present invention and H and I for comparison were adhered so as to match the delayed phase axes and leading phase axes of the polarizing plate with the directions of those of the original polarizing plate.

However, for polarizing plates D and G, a polarizing plate was adhered on only one side of a LCD, and on the other side a TAC film (Ro(589)=0.2 nm, Rt(589)=31 nm) manufactured by Konica Corp. was adhered so as to match the delayed phase axis and leading phase axis of the TAC film with the directions of those of the original polarizing plate.

<Evaluation of Red Hue in Black Areas of the Display>

Evaluation of red hue in black areas of the display for liquid crystal displays LCDa-LCDi was carried out by visual observations (sensory observations) of randomly selected 30 subjects under conditions of (i) applying no voltage to the display; and (ii) at a viewing angle of 80 degrees. The results of a majority of these observations are given below:

A: Substantially no red hue is observed.
B: Slight red hue is observed but it is not a practical problem.
C: Appreciable red hue is observed so that the display is not suitable for practical use.

| LCD No. | Evaluation of red hue |
|---|---|
| LCDa | B |
| LCDb | B |
| LCDb | B |
| LCDc | B |
| LCDd | B |
| LCDe | B |
| LCDf | B |
| LCDg | B |
| LCDh | C |
| LCDi | C |

The above results revealed that, in liquid crystal displays a-g using optical compensation films A-G of the present invention, occurrence of red hue was only slight and was not a practical problem, while in liquid crystal displays h and i in which polarizing plates having respectively optical compensation films H and I for comparison, were adhered on liquid crystal cells, occurrence of noticeable red hue was observed and the LADS were not practically suitable.

Example 2

<Preparation of Optical Compensation Films A1-G1 and I1>

Optical compensation films A1-G1 (of the present invention) and I1 (for comparison) were prepared in the same manner as described in Example 1 for the preparation of optical compensation films A-G (of the present invention) and I (for comparison) except that the optical compensation films were prepared to exhibit the following properties: for each of the optical compensation films A1-G1 and I1, the ratio of retardation values A ($R_{70}(589)/Ro(589)$) is in the range of 1.25-1.40 and the ratio of retardation values B ($R_{50}(589)/Ro(589)$) is in the range of 1.10-1.25.

TABLE 3

| Optical compensation film No. | $R_{50}(589)/R_0(589)$ | $R_{70}(589)/R_0(589)$ | Remarks |
|---|---|---|---|
| A1 | 1.12 | 1.26 | Inv. |
| B1 | 1.24 | 1.38 | Inv. |
| C1 | 1.15 | 1.30 | Inv. |
| D1 | 1.11 | 1.26 | Inv. |
| E1 | 1.07 | 1.18 | Inv. |
| F1 | 1.20 | 1.31 | Inv. |
| G1 | 1.27 | 1.44 | Inv. |
| I1 | 0.04 | 0.02 | Comp. |

Inv.: Present Invention
Comp.: Comparison

The in-plane retardation values and the wavelength dispersions of the obtained films were evaluated as follows:

<In-Plane Retardation Values and Wavelength Dispersions>

Retardation ratio A is defined as ($R70(589)/Ro(589)$), wherein, $R_{70}(589)$ representing a retardation value of the optical compensation film measured by a method of: (i) placing the film on a plane; (ii) rotating the film 70 degrees on a delayed phase axis of the film; and (iii) measuring the retardation value from a direction perpendicular to the original plane at a wavelength of 589 nm, and $Ro(589)$ representing an in-plane retardation of the film measured at 589 nm. Retardation ratio B is defined as ($R_{50}(589)/Ro(589)$), wherein, $R_{50}(589)$ representing a retardation value of the film determined in the same manner as $R_{70}(589)$ except that the film is rotated 50 degrees on the delayed phase axis of the film and $Ro(589)$ represents the same as described above. Retardation ratios A and B were determined as follows:

(1) Each In-Plane Retardation Values and Wavelength Dispersion.

KOBRA-21ADH (manufactured by Oji Keisokukiki Co., Ltd.) was used for a measurement of a rotating angle of 50 degrees or less.

For a measurement of a rotating angle of more than 50 degrees, a spectroellipsometer DVA36VW (manufactured by Mizojiri Optical Co., Ltd.) was used.

(2) Refractive Indices (nx, ny and nz) at Various Wavelengths.

Refractive indices at various wavelengths were determined by KOBRA-21ADH. An Abbe refractometer and a spectrometric light source were also used for the determination of wavelength dispersion.

In a liquid crystal display employing one of the optical compensation films of the present invention, of which the retardation ratio A ($R_{70}(589)/Ro(589)$) is in the range of 1.25-1.40 and the retardation ratio B ($R_{50}(589)/Ro(589)$) is in the range of 1.10-1.25, the red hue problem was improved to a level in which substantially no red hue was observed, while in a liquid crystal display employing optical compensation film I for comparison, a noticeable red hue was observed and the display was not in a level of commercialization.

Example 3

<Preparation of Optical Compensation Films A2-G2>

Optical compensation films A2-G2 were prepared in the same manners as those of A-G of Example 1 except for that the films were prepared to exhibit the (($R(b)o+R(b)t/R(e)o$)) values in the range of 0.44-2.05.

<Optical Roperties of Optically Biaxial Support and Optically Anisotropic Layers>

In-plane retardation values of the optical compensation films of the present invention were determined and the values of the ratio of Formula (5) were calculated:

| Optical Compensation Film | (($R(b)o + R(b)t/R(e)o$)) |
|---|---|
| A2 | 1.83 |
| B2 | 1.67 |
| C2 | 2.11 |
| D2 | 2.00 |
| E2 | 0.32 |
| F2 | 0.47 |
| G2 | 1.68 |

In the liquid crystal displays employing optical compensation films A2-G2 of the present invention which were prepared to exhibit the (($R(b)o+R(b)t/R(e)o$)) values of not less than 0.44 and less than 2.05, it was found that the appearance of red hue in the black area of the display was reduced to a level in which substantially no red hue was observed.

Example 4

Liquid crystal displays LCDa1-LCDh1 were prepared in the same manner as that of LCDa-LCDh described in Example 1 except for that the liquid crystal displays were prepared to exhibit the ($Ps(\lambda)/Pc(\lambda)$) values of Formula (10) (described in claim 8) as shown below, wherein X represents a wavelength in the range of 500-670 mm.

The sum $So(\lambda)$ of the in-plane retardation values ($Ro(\lambda)$) at a wavelength λ was assigned in Formulae (11) and (12) to obtain the $Ps(\lambda)/Pc(\lambda)$ value:

| Liquid Crystal Display(*) | $Ps(\lambda)/Pc(\lambda)$ |
|---|---|
| LCDa1 | 0.47-0.52 |
| LCDb1 | 0.64-1.74 |
| LCDc1 | 0.67-0.82 |
| LCDd1 | 0.23-1.11 |
| LCDe1 | 0.50-0.75 |
| LCDf1 | 0.84-1.51 |
| LCDg1 | 0.32-0.52 |

*Verticaly Aligned ECB mode Liquid Crystal Display

In the liquid crystal displays of the present invention which were prepared to exhibit the $Ps(\lambda)/Pc(\lambda)$ values in the range of 0.22-1.75, the appearance of red hue in the black area of the display was further reduced and substantially no red hue was observed, while in the liquid crystal displays described in Example 1, slight red hue was observed.

In the present invention, the following are provided: (i) an optical compensation film which enables a viewing angle of not less than 80 degrees in all directions and notably reduces a red hue in a black area of the display, when used in a liquid crystal display, and (ii) a polarizing plate and a liquid crystal display employing the above mentioned optical compensation film.

What is claimed is:

1. An optical compensation film comprising a support exhibiting optical biaxiality, on which at least one optically anisotropic layer is provided, wherein:
   (i) the optically anisotropic layer is formed by orienting molecules of a liquid crystalline compound in a manner that an average tilt angle of the molecules is not more than 4 degrees followed by fixing the orientation of the liquid crystal molecules;
   (ii) in-plane retardation values of the optical compensation film Ro($\lambda$) given by Formula (1) are as follows:
   Ro(589): 40-130 nm
   Ro(600): 35-125 nm
   Ro(630): 35-120 nm;
   (iii) an out-of-plane retardation value in a thickness direction of the optical compensation film Rt($\lambda$) represented by Formula (2) is in the range of 120-400 nm when measured at wavelengths of 500-630 nm;
   (iv) Ro(589), Ro(600) and Ro(630) satisfy Formula (3); and
   (v) a ratio of $R_{70}$(589)/Ro(589) is 1.25-1.40 and a ratio of $R_{50}$(589)/Ro(589) is 1.10-1.25, $R_{70}$(589) being a retardation value of the optical compensation film measured by a method of:
      (a) placing the film parallel to a reference plane;
      (b) rotating the film 70 degrees on an in-plane delayed phase axis of the film; and
      (c) measuring the retardation value from a direction perpendicular to the reference plane at a wavelength of 589 nm;
   $R_{50}$(589) being a retardation value of the optical compensation film measured by the same method as $R_{70}$(589) except that the film being rotated 50 degrees on the in-plane delayed phase axis of the film;
   and the in-plane delayed phase axis representing an axis of a direction giving a maximum in-plane retardation value:

$Ro(\lambda)=(nx(\lambda)-ny(\lambda))\times d$     Formula (1)

$Rt(\lambda)=((nx(\lambda)+ny(\lambda))/2-nz(\lambda))\times d$     Formula (2)

$1.0<B<7.0$     Formula (3)

$B=(Ro(589)-Ro(630)/(Ro(600)-Ro(630))$ nx($\lambda$) representing a refractive index in a x direction which gives a maximum refractive index in the plane of the optical compensation film;
   ny($\lambda$) representing a refractive index in a y direction which is orthogonal to the x direction in the plane of the optical compensation film;
   nz($\lambda$) representing a refractive index in the thickness direction of the optical compensation film;
   $\lambda$ representing a wavelength (nm) at which each measurement is carried out; and
   d representing a thickness (nm) of the optical compensation film.

2. The optical compensation film of claim 1 wherein retardation values of the optically biaxial support and the optically anisotropic layer measured at a wavelength of 589 nm satisfy Formula (5), $0.44<((R(b)o+R(b)t)/R(e)o<2.05$     Formula (5)

R(b)o representing an in-plane retardation value of the support defined by Formula (6);
   R(b)t representing an out-of plane retardation value of the support in a thickness direction defined by Formula (7); and
   R(e)o representing an in-plane retardation value of the optically anisotropic layer defined by Formula (8), $R(b)o=(n(b)x-n(b)y)\times d(b)$     Formula (6)

$R(b)t((n(b)x+n(b)y)/2-n(b)z)\times d(b)$     Formula (7)

$R(e)o(n(e)x-i(e)y)\times d(e)$     Formula (8)

n(b)x representing a refractive index in a x direction which gives a maximum refractive index in the plane of the support;
   n(b)y representing a refractive index in a y direction which is orthogonal to the said x direction in the plane of the support;
   n(b)z representing a refractive index in a thickness direction of the support;
   d(b) representing a thickness (nm) of the support;
   n(e)x representing a refractive index in an x direction which gives a maximum refractive index in the plane of the optically anisotropic layer;
   n(e)y representing a refractive index in a y direction which is orthogonal to the x direction in the plane of the optically anisotropic layer; and
   d(e) representing a thickness (nm) of the optically anisotropic layer.

3. The optical compensation film of claim 1 wherein the liquid crystalline compound comprises a nematic liquid crystalline compound.

4. An optical compensation film comprising a support exhibiting optical biaxiality, on which at least one optically anisotropic layer is provided, wherein:
   (i) the optically anisotropic layer is formed by orienting molecules of a liquid crystalline compound in a manner that an average tilt angle of the molecules is not more than 4 degrees followed by fixing the orientation of the liquid crystal molecules;
   (ii) in-plane retardation values of the optical compensation film Ro($\lambda$) given by Formula (1) are as follows,
   Ro(589): 40-130 nm
   Ro(600): 35-125 nm
   Ro(630) 35-120 nm;
   (iii) an out-of-plane retardation value in a thickness direction of the optical compensation film Rt($\lambda$) represented by Formula (2) is in the range of 120-400 nm when measured at wavelengths of 500-630 nm;
   (iv) Ro(589), Ro(600) and Ro(630) satisfy Formula (3); and
   (v) a wavelength dispersion of the retardation values of the film satisfies Formula (4):

$Ro(\lambda)=(nx(\lambda)-ny(\lambda))=d$     Formula (1)

$Rt(\lambda)+((nx(\lambda)+ny(\lambda))/2-nz(\lambda))\times d$     Formula (2)

$1.0<B<7.0$     Formula (3)

$B=(Ro(589)-Ro(630))/(Ro(600)-Ro(630))$ $nx(\lambda)$ representing a refractive index in a x direction which gives a maximum refractive index in the plane of the optical compensation film;

$ny(\lambda)$ representing a refractive index in a y direction which is orthogonal to the x direction in the plane of the optical compensation film;

$ny(\lambda)$ representing a refractive index in a y direction which is orthogonal to the x direction in the plane of the optical compensation film;

$nz(\lambda)$ representing a refractive index in the thickness direction of the optical compensation film;

representing a wavelength (nm) at which each measurement is carried out; and d representing a thickness (nm) of the optical compensation film, $$0 < C/D < 7.0 \quad \text{Formula (4)}$$

$C = (R_{50}'(589) - R_{50}'(630))$
$D = (R_{70}'(589) - R_{70}'(630))$
$R_{70}'(\lambda) = (nx_{70}'(\lambda) - ny_{70}'(\lambda)) \times d$
$R_{50}'(\lambda) = (nx_{50}'(\lambda) - ny_{50}'(\lambda)) \times d$ $R_{70}'(589)$ and $R_{70}'(630)$ each being a retardation value of the optical compensation film measured by a method of:
(i) placing the film parallel to a reference plane;
(ii) rotating the film 70 degrees on an in-plane leading phase axis of the film; and
(iii) measuring the retardation value from a direction perpendicular to the reference plane at wavelengths 589 and 630 nm, respectively.

$R_{50}'(589)$ and $R_{50}'(630)$ each being a retardation value of the optical compensation film measured by the same method as $R_{70}'(589)$ and $R_{70}'(630)$ except that the film being rotated 50 degrees on the in-plane leading phase axis of the film;

the in-plane leading phase axis representing an axis in the plane of the film being orthogonal to the in-plane delayed phase axis which is an axis of a direction giving a maximum in-plane retardation value.

5. The optical compensation film of claim 4 wherein retardation values of the optically biaxial support and the optically anisotropic layer measured at a wavelength of 589 nm satisfy Formula (5), $$0.44 < ((R(b)o + R(b)t)/R(e)o) < 2.05 \quad \text{Formula (5)}$$

$R(b)o$ representing an in-plane retardation value of the support defined by Formula (6);

$R(b)t$ representing an out-of plane retardation value of the support in a thickness direction defined by Formula (7); and $R(e)o$ representing an inplane retardation value of the optically anisotropic layer defined by Formula (8), $$R(b)o = (n(b)x - n(b)y) \times d(b) \quad \text{Formula (6)}$$

$$R(b)t = ((n(b)x + n(b)y)/2 - n(b)z) \times d(b) \quad \text{Formula (7)}$$

$$R(e)o = (n(e)x - i(e)y) \times d(e) \quad \text{Formula (8)}$$

$n(b)x$ representing a refractive index in a x direction which gives a maximum refractive index in the plane of the support;

$n(b)y$ representing a refractive index in a y direction which is orthogonal to the said x direction in the plane of the support;

$n(b)z$ representing a refractive index in a thickness direction of the support;

$d(b)$ representing a thickness (nm) of the support;

$n(e)x$ representing a refractive index in an x direction which gives a maximum refractive index in the plane of the optically anisotropic layer;

$n(e)y$ representing a refractive index in a y direction which is orthogonal to the x direction in the plane of the optically anisotropic layer; and $d(e)$ representing a thickness (nm) of the optically anisotropic layer.

6. The optical compensation film of claim 4 wherein the liquid crystalline compound comprises a nematic liquid crystalline compound.

7. A polarizing plate comprising: (i) the optical compensation film of claim 1 or 4 and (ii) a polarizing film or a polarizing element, wherein an angle between an in-plane delayed phase axis of the optical compensation film and an absorbing axis of the polarizing film or of the polarizing element is 85-95 degrees.

8. A vertically aligned ECB type liquid crystal display having the polarizing plate of claim 7 on one surface or on both surfaces of a liquid crystal cell of the liquid crystal display.

9. A vertically aligned ECB type liquid crystal display having the polarizing plate of claim 7 on one surface or on both surfaces of a liquid crystal cell of the liquid crystal display wherein $So(\lambda)$ and $C(\lambda)$ satisfy Formulae (9)-12):

$$0.21 \times C(589) \leq So(589) \leq 0.66 \times C(589) \quad \text{Formula (9)}$$

$$0.22 \leq Ps(\lambda)/Pc(\lambda) \leq 1.75 \quad \text{Formula (10)}$$

$$Ps(\lambda) = (So(\lambda)/So(589) - 1) \times 100 \quad \text{Formula (11)}$$

$$Pc(\lambda) = (C(\lambda)/C(589) - 1) \times 100 \quad \text{Formula (12)}$$

$So(\lambda)$ representing a sum of in-plane retardation values $(Ro(\lambda))$ of:
(i) the polarizing films or the polarizing elements of the polarizing plates of claim 6 provided on one surface or both surfaces of the said liquid crystal cell;
(ii) the optical compensation films in the polarizing plates; and
(iii) the liquid crystal cell, $C(\lambda)$ representing a product of a birefringence $\Delta n(\lambda)$ and a thickness of the liquid crystal cell, $\Delta n(\lambda) \times d$; and $\lambda$ representing a wavelength in a range of 500-670 nm.

* * * * *